A. M. BATES.
RING WELDING MACHINE.
APPLICATION FILED NOV. 13, 1911.

1,124,258.

Patented Jan. 12, 1915.

A. M. BATES.
RING WELDING MACHINE.
APPLICATION FILED NOV. 13, 1911.

1,124,258.

Patented Jan. 12, 1915.
5 SHEETS—SHEET 3.

Witnesses.
Geneva Hirth
Edward T. Wray

Inventor.
Adelmer M. Bates
by Parker & Carter
Attorneys.

UNITED STATES PATENT OFFICE.

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

RING-WELDING MACHINE.

1,124,258.  Specification of Letters Patent.  Patented Jan. 12, 1915.

Application filed November 13, 1911. Serial No. 659,895.

*To all whom it may concern:*

Be it known that I, ADELMER M. BATES, a citizen of the United States, residing at Chicago, in the county of Cook and State of Illinois, have invented a certain new and useful Improvement in Ring-Welding Machines, of which the following is a specification.

My invention relates to ring welding machines and has for one object to provide a means for forming and welding rings.

It is illustrated in one form diagrammatically in the accompanying drawings, wherein—

Like parts are indicated by like letters throughout the several figures.

The base A which is mounted on the channel bar foundation $A^1$ has projecting from it the frame $A^2$. The rollers $A^3$ are rotatably mounted on the frame $A^2$ in opposition to the rollers $A^4$ which are rotatably mounted on the block $A^5$. The block $A^5$ is slidably mounted on the frame $A^2$ and is adjustably held in position therealong by the cap screws $A^6$ screw threaded in the bracket $A^7$ on the frame $A^2$. The wire $A^8$ which leads from the reel not shown passes between the rollers $A^3$, $A^4$ through the wire check $A^9$. The wire check $A^9$ is mounted on the lug $A^{10}$ projecting from the frame $A^2$ and contains the adjustable wire engaging pin $A^{11}$ held in position by the set screw $A^{12}$ and in opposition to the check roll $A^{13}$ riding on the inclined track $A^{14}$ and held against the wire $A^8$ by the plunger $A^{15}$ and spring $A^{16}$.

The blocks B project upwardly from the base A and support the bearings $B^1$ in which is rotatably mounted the drive shaft $B^2$ driven by any suitable source of power not shown applied to the pulley $B^3$. The gear $B^4$ which carries the sleeve $B^5$ is rotatably mounted on the shaft $B^2$ and carries on one side the adjustable feeding segment $B^6$ which is provided with the curved slots $B^7$ engaged by the cap screws $B^8$ in the gear $B^4$. The sleeve $B^9$ which is keyed to the sleeve $B^5$ carries the wire bending cam $B^{10}$ and terminates at one end in the flat clutch disk $B^{11}$ having the circuit closing cam surface $B^{12}$ thereabout and being provided with the pockets $B^{13}$ in opposition to the clutch finger $B^{14}$ on the flat clutch disk $B^{15}$. The disk $B^{15}$ is mounted on the sleeve $B^{16}$ feathered to the shaft $B^2$ and having the annular slot $B^{17}$ thereabout.

The plunger C which is slidably mounted in the overhanging portion of the frame $A^2$ carries the upwardly extending shaft $C^1$ which is slidably mounted in the screw threaded adjustable sleeve $C^2$, the downward movement of which is limited by the screw threaded split collar $C^3$ in opposition to the upper end of the sleeve $C^2$. The spring $C^4$ surrounds the shaft $C^1$ and is interposed between the plunger C and the collar $C^2$. The fork $C^5$ projects downwardly from the plunger C and carries the fixed shaft $C^6$ upon which is rotatably mounted the sleeve $C^7$ carrying the gear $C^8$ in mesh with the gear $B^4$ and having on one side an adjustable feeding segment $C^9$ provided with curved slots $C^{10}$ and holding cap screws $C^{11}$. The gear $C^8$ has at one side the welding cam $C^{12}$ and at the other side the ejector cam $C^{13}$.

The bracket D which is carried by the base A and has the overhanging guide member $D^1$ provided with the horizontally disposed slot $D^2$ containing the guide blocks $D^3$ having the wire guiding slot $D^4$ in the path of the wire $A^8$. The slot $D^4$ is closed for a portion of its length by the block $D^5$ held firmly against the member $D^3$ by the set screw $D^6$ and for the remainder of its length by the adjustable anvil block $D^7$ held in position by the set screw $D^8$ and adjustable in position by the set screw $D^9$ having the conical surface $D^{10}$ in opposition to the inclined surface $D^{11}$. The bracket D is provided with the outwardly projecting overhanging member $D^{12}$ in which is slidably mounted the rack $D^{13}$ held in position by the cover plate $D^{14}$ and containing the bolt $D^{15}$ adjustably held therein by the cap screws $D^{16}$, $D^{17}$ and terminating at its inner end in the fork $D^{18}$ carrying the cam roller $D^{19}$ in opposition to the wire bending cam $B^{10}$.

The lug E projecting upwardly from the bracket member $D^{12}$ contains the bearings $E^1$, $E^2$ in which are mounted respectively the shafts $E^3$, $E^4$ terminating in the pinions $E^5$, $E^6$ in mesh one with the other. The pinion $E^5$ is in mesh with the rack $D^{13}$, the shafts $E^3$, $E^4$ carry each the wire bending fingers $E^7$, $E^8$, the finger $E^8$ being provided with the adjustable wire cutting knife $E^9$ in opposition to the cutting edge of the anvil block $D^7$. The fingers $E^7$, $E^8$ are grooved at their outer ends at $E^{10}$ to engage the wire. The finger $E^8$ is rigidly attached to the shaft $E^4$, the finger $E^7$ is rotatably mounted on the shaft $E^3$ and is provided with the slot $E^{11}$ in which travels the finger $E^{12}$ on the shaft $E^3$. The spring $E^{13}$ held at one end on the finger $E^7$ and at the other end in the adjustable collar $E^{14}$ holds the finger $E^8$ slightly in advance of the finger $E^7$ and permits the wire end carried thereby to be pressed in position against the forming head before the other, thus holding the free ends one on top of the other.

Figure 1:
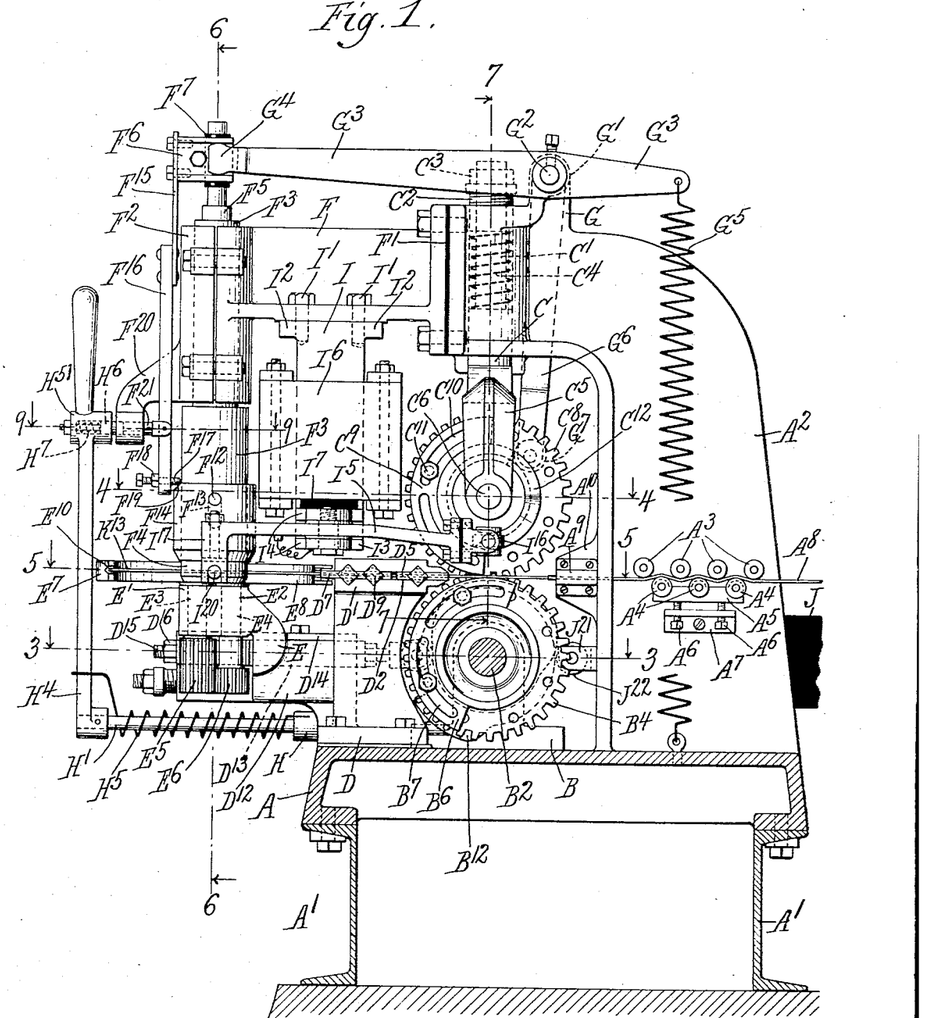
Figure 1 is a right hand side elevation with parts broken away.
Figure 2:
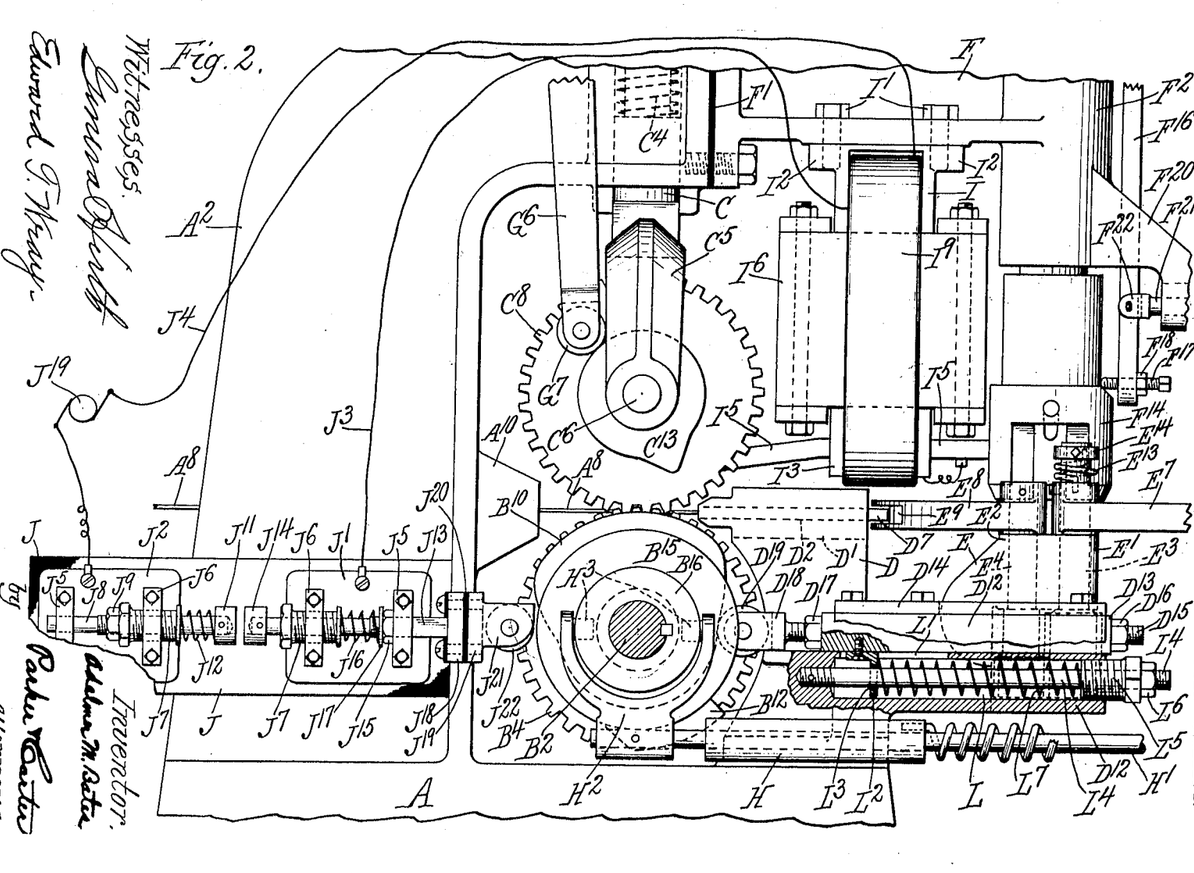
Fig. 2, is a left hand side elevation with parts broken away.
Figure 3:
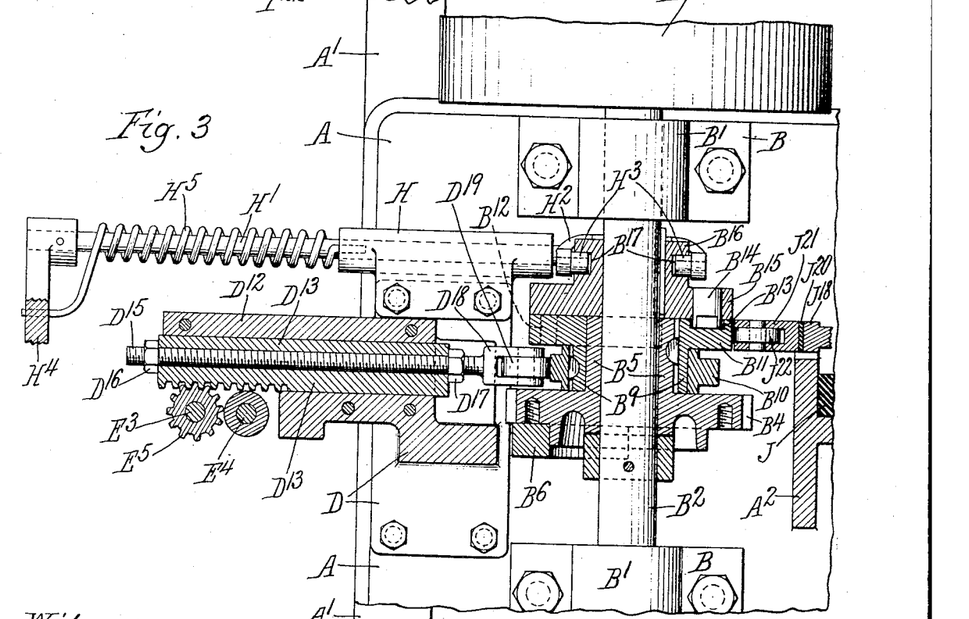
Fig. 3, a section along the line 3—3 of Fig. 1.
Figures 6, 7, 8, 9:
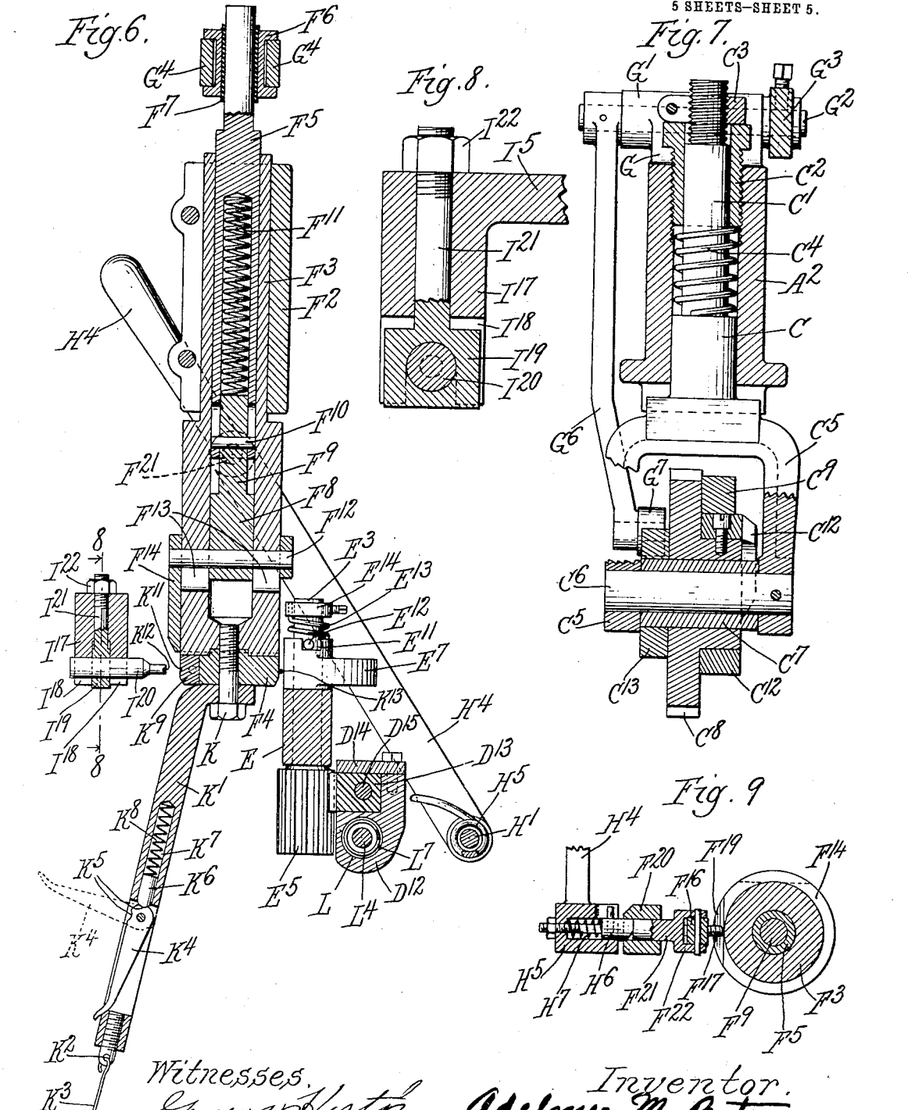
Fig. 6, a section along the line 6—6 of Fig. 1.
Fig. 7, a section along the line 7—7 of Fig. 1.
Fig. 8, a section along the line 8—8 of Fig. 6.
Fig. 9, a section along the line 9—9 of Fig. 1.

The frame F which projects outwardly from and is supported by the overhanging portion of the frame $A^2$ is separated therefrom by the insulating material $F^1$ and terminates in the split cylindrical head $F^2$ in which is mounted the sleeve $F^3$ carrying at its lower end the forming head $F^4$ in opposition to the fingers $E^7$, $E^8$. The hollow plunger $F^5$ is slidably mounted in the sleeve $F^3$ and carries at its upper end the block $F^6$ insulated therefrom by the sleeve $F^7$. The plug $F^8$ is slidably mounted in the lower end of the sleeve $F^3$ and has the projection $F^9$ slidably mounted in the interior of the plunger $F^5$ and carrying the pin $F^{10}$ in opposition to the end thereof. The spring $F^{11}$ is contained within the hollow plunger $F^5$ and abuts upon the end of the projection $F^9$. The plug $F^8$ carries the pin $F^{12}$ which projects outwardly on either side through the slots $F^{13}$ in the sleeve $F^3$ and carries the ejector sleeve $F^{14}$ which is slidably mounted on the sleeve $F^3$ and adapted to travel down toward the forming head $F^4$ and is cut away, as indicated in Figs. 2 and 6, adjacent the shafts $E^3$, $E^4$. The spring $F^{15}$ which projects downwardly from the block $F^6$ carries the lever $F^{16}$ having a set screw $F^{17}$ adjustably mounted therein and held in position by the lock nut $F^{18}$. The ejector sleeve $F^{14}$ is provided with the inclined surface $F^{19}$ in opposition to the screw $F^{17}$. The bracket $F^{20}$ which projects outwardly from the head $F^2$ carries the rod $F^{21}$ which is slidably mounted therein and terminates in the fork $F^{22}$ in pivotal engagement with the lever $F^{16}$.

The lug G which projects outwardly from the frame $A^2$ is provided with the bearing $G^1$ in which is rotatably mounted the rock shaft $G^2$. The lever $G^3$ which is rigidly mounted on the rock shaft $G^2$ is provided at one end with the head $G^4$ in rotatable and slidable engagement with the block $F^6$ and carries at the other end the tension spring $G^5$ anchored on the base A. The ejector lever $G^6$ is rigidly mounted on the rock shaft $G^2$ and is provided at its lower end with the cam roller $G^7$ in opposition to the cam $C^{13}$.

The bearing H which is rigidly mounted on the base A carries the shaft $H^1$ rotatably mounted therein. The shaft $H^1$ is provided at one end with the clutch yoke $H^2$ having the fingers $H^3$ engaging the slots $B^{17}$ in the sleeve $B^{16}$ and carries at the other end the lever $H^4$ engaged by the spiral spring $H^5$, which spring is anchored at the other end in the bearing H. The lever $H^4$ is provided adjacent its outer end with the boss $H^{51}$ in which is slidably mounted the plug $H^6$ in opposition to the end of the rod $F^{21}$ and adapted to be forced into the passage way in the lug $F^{20}$ by the spring $H^7$.

The copper channel I is attached to the frame F by the cap screws $I^1$ engaging the flanges $I^2$ and is provided at its lower end with the horizontally disposed extension $I^3$ terminating in the forks $I^4$ in which is pivotally mounted the lever $I^5$. The laminated iron core $I^6$ is mounted upon the extension $I^3$ and separated therefrom by the insulation $I^7$ and surrounds the channel I, being separated therefrom by the insulation $I^8$. The primary coil $I^9$ surrounds a portion of the core $I^6$ and is located partially within the channel I, being separated therefrom and from the core by the insulation $I^{10}$. The lever $I^5$ carries the head $I^{11}$ separated therefrom by the insulation $I^{12}$ and containing the square rod $I^{13}$ slidably mounted therein in opposition at one end to the adjustable spring $I^{14}$. The rod $I^{13}$ carries at its outer end the forks $I^{15}$ in which is rotatably mounted the cam roller $I^{16}$, in engagement with and in opposition to the welding cam $C^{12}$. The lever $I^5$ has at its other end the head $I^{17}$ terminating in the slotted forks $I^{18}$ between which is slidably mounted the perforated block $I^{19}$ containing the electrode $I^{20}$. The screw $I^{21}$ carries the nut $I^{22}$ which is adapted to draw the block $I^{19}$ inwardly and clamp the electrode $I^{20}$ against the head $I^{17}$.

The frame A is provided on one side with the plate J which supports the terminal plates $J^1$, $J^2$ insulated therefrom and having the conductors $J^3$, $J^4$ leading to the coil $I^9$, one of them through the generator $I^{19}$. The plates $J^1$, $J^2$ are provided with the lugs $J^5$, $J^6$. The lugs $J^6$ have each a sleeve $J^7$ adjustably screw threaded therein. The shaft $J^8$ is slidably mounted in the sleeve $J^7$ and the lug $J^5$ on the plate $J^2$ is limited in its motion in one direction by the nut $J^9$ and has at its other end the contact head $J^{11}$ between which and the sleeve $J^7$ is interposed the spring $J^{12}$. The rod $J^{13}$ is slidably mounted in the sleeve $J^7$ and the lug $J^5$ on the plate $J^1$ is provided at one end with the head $J^{14}$ in opposition to the head $J^{11}$ limited in its movement away from the head $J^{11}$ by the nut $J^{15}$ in opposition to the sleeve $J^7$. The spring $J^{16}$ interposed between the opposed end of the sleeve $J^7$ and the nut and washer $J^{17}$ tends to draw the head $J^{14}$ away from the head $J^{11}$. The collar $J^{18}$ on the opposed end of the rod $J^{13}$ is separated from the collar $J^{19}$ by the insulation $J^{20}$. The forks $J^{21}$ projecting outwardly from the collar $J^{19}$ contain the cam roller $J^{22}$ in opposition to the circuit closing cam $B^{12}$.

The forming head $F^4$ is rigidly attached to the base of the sleeve $F^3$ by the bolt K which also supports the downwardly and outwardly inclined guide rod $K^1$ which is provided at its lower end with the eyelet $K^2$ in which is fastened the ring receiving wire $K^3$. The rod $K^1$ is slotted adjacent its lower end and carries the rotatably mounted finger $K^4$ which is notched at $K^5$ to engage the pin $K^6$ slidably mounted in the passage $K^7$ in the rod $K^1$ and outwardly forced by the spiral spring $K^8$ therein. The forming head $F^4$ is provided with the fixed terminal or electrode $K^9$ held in position therein by the set screw $K^{10}$ in the path of the movable electrode $I^{20}$. The electrodes $K^9$, $I^{20}$ may each be provided preferably with the horizontal grooves $K^{11}$, $K^{12}$ opposed one to the other adapted to engage the wire $K^{13}$ after it has been cut off from the wire $K^8$ and has been bent about the forming head $F^4$ by the fingers $E^7$, $E^8$. These grooves need not be cut in the electrode, although preferably they are so cut because the action of the electrode will almost immediately cause them to form of their own accord.

Figure 4:
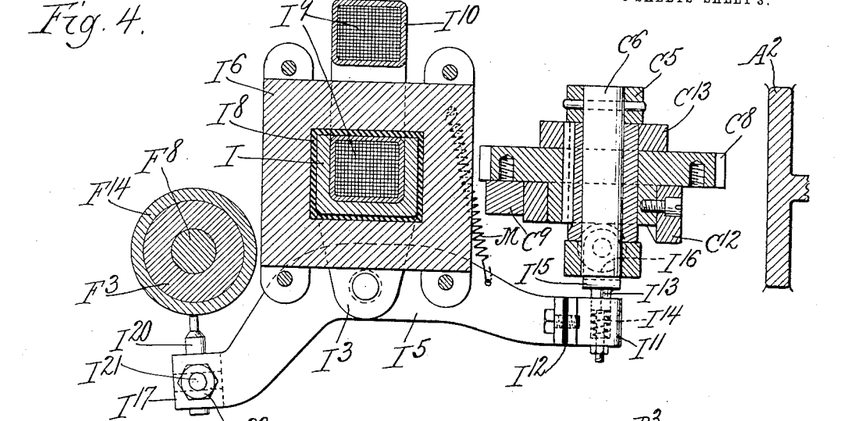
Fig. 4, a section along the line 4—4 of Fig. 1.

It will be observed that the frame F and parts carried by F are insulated from the frame A and parts carried by it at their three points of contact, namely, at the point of contact between the frame F and frame $A^2$ by the insulation $F^1$ and between the welding lever and the welding cam by the insulation $I^{12}$ interposed between the end of the lever and the cam roller head, and between the sleeve $F^5$ and the block $F^6$ by the insulating sleeve $F^7$. Therefore when a circuit is closed through the primary coil, the induced current which is set up in the copper channel I which serves as a secondary coil is compelled to pass through the copper channel I through the frame F, the head $F^2$, the sleeve $F^3$, the forming head $F^4$, the electrodes $K^9$, $I^{20}$, the lever $I^5$ and the forks $I^4$ back to the copper channel I. The spring M in Fig. 4 is attached at one end to the lever $I^5$ and at the other end of the core $I^6$ to hold the cam roller $I^{16}$ against the welding cam and to lift the movable electrode out of contact with the fixed electrode as soon as the welding has been done.

The overhanging member $D^{12}$ contains beneath the rack $D^{13}$ the passage way L, having adjacent one end and at the top a slot $L^1$. The finger $L^2$ is rigidly attached to the rack $D^{13}$, projects downwardly through the slot $L^1$ into the passage L and is provided with the perforation $L^3$ which surrounds the rod $L^4$ screw threaded at one end into the support $D^{12}$ and slidably mounted at the other end in the sleeve $L^5$ which is screw threaded in the passage L and locked in position by the lock nut $L^6$ on the rod $L^4$. The spring $L^7$ is located in the passage L, surrounds the rod $L^4$, is pressed between the finger $L^2$ and the end of the sleeve $L^5$ and tends to return the rack $D^{13}$ toward the forming cam, thus opening the forming arms.

Figures 11, 12, 13:
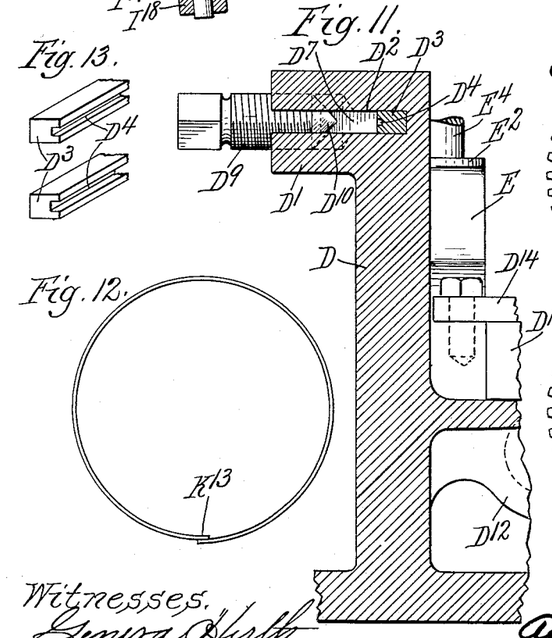
Fig. 11, a section along the line 11—11 of Fig. 5.
Fig. 12, a plan view of the finished ring.
Fig. 13, a perspective view of a pair of removable wire guides.

In Fig. 13 I have shown some extra removable wire guide blocks having wire grooves of varying sizes to provide for different sized wires.

Figure 5:
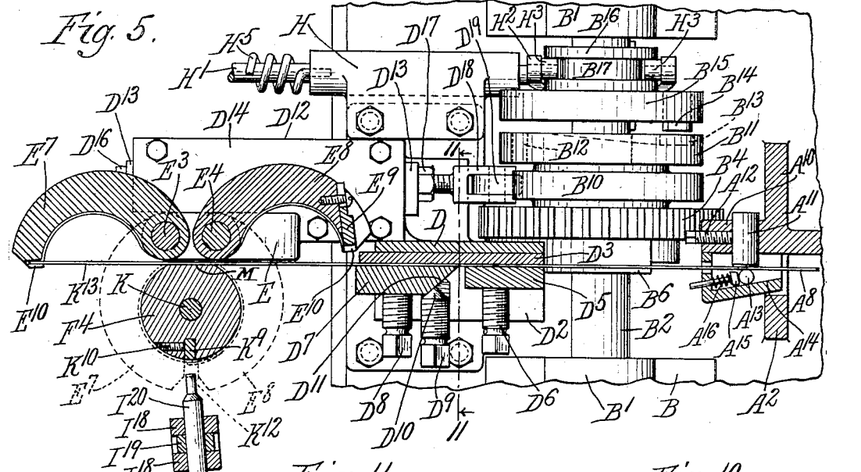
Fig. 5, a section along the line 5—5 of Fig. 1.

In Fig. 5 I have shown a forming head $F^4$ provide with the flattened area M on the rear side of the head removed from the electrode. The function of this of course is to cause my device to produce a ring having a flat side, although it will be understood that this feature might be dispensed with.

It will further be understood that my invention is not limited to the forming head and bending fingers of the exact contour indicated, and different shapes might conceivably be used under certain circumstances for forming rings other than circular.

Figure 10:
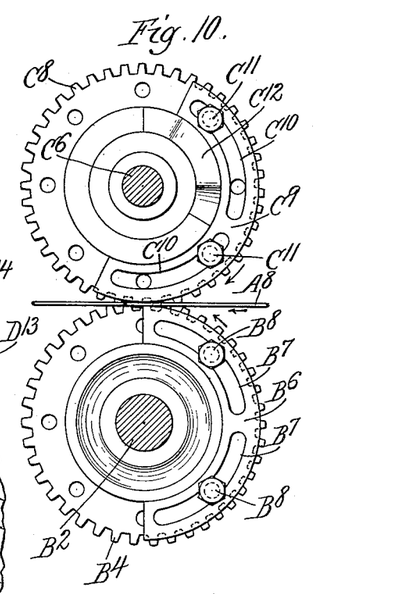
Fig. 10, a side view of the feed rolls in position to commence feeding.

The use and operation of my invention are as follows: Wire is fed from any suitable reel or supply between the straightening rollers on the frame of the machine, the function of which is to take out of the wire the bend or deformation caused by the manner in which the wire is mounted on the reel. From these rollers the wire passes through the wire check whose function is to prevent the wire being drawn back into the reel as might sometimes happen, owing to its elasticity. This check consists of a roll which contacts the moving wire and is held thereagainst by a spring. The anvil against which the wire is pressed by the spring is adjustable in position to provide for varying sizes of wire. It will be observed that should the wire tend to draw back, it will carry with it the roller, causing the roller to ride up on an inclined plane, and bind against the wire and hold the wire against the anvil or block. The wire passes from the check between the feeding segments on the driving gears. These segments are each adjustable in position about the periphery of the gear which carries it, and by adjusting the position of each of said segments with relation to the other, any suitable length of feed of the wire for each revolution of the gears may be had. It will be observed that when the segments coincide absolutely, they will be together as the gears rotate for exactly one-half revolution of the gears, since the segments are semi-circular and the wire will therefore be thrown forward during one-half revolution of the gear. If this feed is too great, the segments are shifted in position, as in Fig. 10, where it will be observed that the segment on one gear overlaps the segment on the other, and as they feed only when the two segments are in opposition one with the other. Thus it will be observed that any feed between a feed for one-half revolution and no feed at all may be had. The upper gear is mounted on a shaft held in a spring supported fork, thus giving an elastic or yielding pressure upon the wire and enabling the segments to grip the wire smoothly and firmly. From the feeding segments the wire passes on through the guide slot and past the anvil block. It will be observed that the guide slot or groove is completely closed to prevent the wire from buckling or bending as it is fed forward past the anvil block and past the forming head.

It will be observed that as the gears rotate, a point is reached at which the feed stops. The wire is then held stationary by the wire check and the rotation of the wire bending cam which operates in unison with the gears rotates the wire bending fingers, sweeping them around the forming head. The inner finger, it will be observed, carries at its end the cutting knife in opposition to the anvil block, and this knife cuts off a suitable length of wire. The two ends of the fingers are slotted so that they engage the wire at either end in the same plane and as they instantly press it against the forming head while bending it, there is no tendency for the cut off piece of wire to drop down. It will be observed that the outer finger is rotatably mounted on its shaft and there is a spring interposed between it and the shaft whereby it is held slightly in advance of the cutting finger, and therefore the cutting finger reaches its final position after the other finger. By this means the end of the wire carried by the cutting finger does not rest on the forming head, but upon the other end of the wire itself. A further rotation of the machinery causes the welding cam to rotate the electrode carrying lever about its fulcrum until its electrode presses against the outer end of the wire and compresses the two wires one on top of the other against the fixed electrode on the forming head. A further rotation of the machinery causes the circuit closing cam to force one of the contact heads against the other, thus closing the circuit through the primary coil, the breaking of which as the cam goes on induces the powerful secondary current in the secondary coil, which in my invention takes the form of a copper channel mounted on the frame to weld the two ends of the wire together. It will be observed that the induced current in the secondary coil passes through the copper channel, the portion of the frame, the mandrel which supports the forming head, the forming head itself, through the fixed electrode thence through the two wires which, as heretofore explained, are located one on top of the other so that the current will have passed through both of them in series from the movable electrode, thence through the electrode carrying lever back to the copper channel.

A further rotation of the machinery causes the ejector cam to rock the ejector lever, thus driving the ejector collar down past the forming head. This of course forces the now welded ring off of the forming head and allows it to fall down past the guide rod on the holding wire. When the wire is filled, it can easily be detached and rings mounted on it are then so held that they are easily handled. When the holding wire is being removed, the finger pivotally mounted upon the guide rod is moved up until it projects outwardly, in which position it is held by the spring plunger and catches the rings as they fall, until a new wire can be put in place.

It will be observed that the reciprocating rod which supports the ejector collar carries the head which supports a spring-holding rod on the outside of the forming head supporting mandrel. The plunger which carries the ejector collar is supported from the reciprocating rod by the spring, and in case the ejector mechanism should become caught for any reason, this rod could reciprocate without the plunger moving, but if it did, it would carry with it the spring supported rod and the screw on this rod would ride up over the cam surface on the outside of the ejector collar and as it rode out over this cam surface, it would carry with it the plunger in the lug projecting outwardly from the frame. This plunger would force the block carried by the clutch lever out of engagement with the lug on the frame, and allow the spring controlling this lever to throw it around and throw the clutch out of engagement, thus stopping the feed of the wire to the machine.

It will be observed that in Fig. 5 the forming head is flat for a short distance on the side opposed to the electrode. This is in order that the rings may be formed with a comparatively narrow straight side.

It will be observed that while I have shown a substantially circular forming head, it might take any desirable shape. It will be understood that since all the cams controlling the different parts of the machine are constantly rotating, the different steps overlap one another, but the cams are so designed that although the parts are constantly moving toward their final position, still the functions of the different parts are to a large extent successive and do not interfere one with the other.

It will be observed, therefore, that in my device the wire enters the machine from the reel and is carried therefrom in a straight line forward direction, and my form of machine therefore can be made exceedingly narrow, and I may if desired connect a large number of machines in parallel along a single driving shaft and these machines will then operate in unison, and it will be observed that by this arrangement a large number of machines can be grouped very compactly and will take up a minimum of space.

It will be observed that owing to the fact that the feeding segments are in opposition one with the other only with a portion of the rotation of the main shaft, the feeding of the wire will be intermittent and it will be during the time when the wire is not being fed that the remainder of the operation takes place.

It will be observed that for certain purposes it might be necessary or desirable to make rings of different sizes and by varying the position of the feeding segments, different lengths of wire would be fed through, though this of course would entail changes in other parts of the machine, such as the diameter of the forming head, size of the forming fingers, etc.

The guide blocks which contain the guide slots are removable and blocks having different sized slots may be inserted, thus providing for varying wire diameters, and since only the slot itself need be varied, the blocks may be of the same size and shape and therefore the holding block and the anvil need not be changed.

The arrangement of the forming fingers, it will be observed, is such that the ends of the wire are bent about the forming head in such manner that one rests upon the other and therefore when the movable electrode is brought in such position that it clamps the two free ends together, it rests merely upon one end and holds itself against the other end which itself rests upon the forming head, and therefore when the welding current passes from the movable to the fixed electrode, it passes through the two free ends in series, that is to say, it passes through first one and then the other and all the current passes through each of them.

By my arrangement I provide, first, means for closing a secondary circuit through the electrodes and through the wires to be welded. I then induce in that secondary circuit a powerful secondary current and this may be done in one of two ways. In case I am using a direct primary current I will time my cams so that the circuit through the primary coil and the source of electric power will be closed before the electrode presses down upon the wires to close the secondary circuit. The circuit through the primary coil will then be broken, and this will induce a secondary low tension to the secondary circuit to weld the ring. In case I am using an alternating current for the primary, I might first close the secondary circuit and then close the primary circuit, allowing the secondary current to be induced by the action of the alternating current to weld the rings and then I might open the primary circuit and subsequently open the secondary. It will be observed that by my arrangement I am able to avoid disastrous arcing at the contact point, since the only circuit that is made or broken while the current is passing through it is the high tension primary circuit and the low tension secondary circuit is always open or closed when the system is dead.

In my specifications and claims I have used the words loops and rings in some cases more or less interchangeably. It will be observed that by loops I mean pieces of wire whose opposed ends are fastened together, and these loops or rings might be circular, oval or polygonal and assume any number of sizes or shapes.

It will be observed that the two electrodes may or may not be slotted to engage the ends of the wires to be welded. If they are not slotted, they soon will become so, by the burning action of the welding current and the slots will assume a substantially semi-cylindrical form. The result will be that when the ends of the wire are in a substantially molten condition owing to the great heat of the welding arc, they will be pressed into shape by the holding pressure of the electrode and assume a well nigh circular cross sectional area. The result will be that the size and shape of the cross sectional area of the ring at the welding point will not vary appreciably from the cross section of the ring at any other point.

I claim:

1. In a machine for forming wire loops means for cutting the wire comprising a cutter a grooved guide block and a plurality of removable blocks to close the groove.

2. In a machine for forming wire loops means for cutting the wire comprising a grooved guide block and a plurality of re-rality of removable blocks to close the groove, one of said blocks movable along the length of the wire.

3. In a machine for forming wire loops means for cutting the wire comprising a cutter a grooved guide block and a plurality of removable blocks to close the groove one of said removable blocks adapted to project beyond the grooved guide block and serve as a cutting anvil.

4. In a machine for forming wire loops a wire guide comprising a grooved block and an anvil adjustable toward the grooved block to close the groove and means for moving the anvil along the block.

5. In a machine for forming wire loops a wire guide comprising a grooved block and an anvil adjustable toward the grooved block to close the groove and means for moving the anvil along the block, said anvil adapted to project between the edge of the grooved block and serve as a cutting anvil.

6. In a machine for forming wire loops a wire guide comprising a grooved block and an anvil adjustable toward the grooved block to close the groove and means for moving the anvil along the block and means for moving said anvil comprising a beveled edge on the anvil and a pointed screw engaging the same.

7. In a machine for forming wire loops the combination of a head with arms, means for intermittently causing them to encircle the head, means for feeding the wire across the arms and means for severing a suitable length of said wire and means to adapt the arms to receive, positively hold and carry forward the ends of the wire section.

8. In a wire loop forming machine the combination of a head with means for bending thereabout a section of wire so that its ends lie one above the other and electrodes one embedded within the head at the point of overlap and the other in opposition thereto.

9. In a wire loop forming machine the combination of a head with means for bending thereabout a section of wire so that its ends lie one above the other and electrodes one embedded within the head at the point of overlap and the other in opposition thereto, the outer electrode movable to and from the other.

10. In a wire loop forming machine the combination of a head with means for bending thereabout a section of wire so that its ends lie one above the other and electrodes one embedded within the head at the point of overlap and the other in opposition thereto and means for forcing said electrodes together to clamp the ends of the wire against the head during the welding process.

11. In a wire loop forming machine the combination of a head with means for bending thereabout a section of wire so that its ends lie one above the other and electrodes one embedded within the head at the point of overlap and the other in opposition thereto and means for yieldingly forcing said electrodes together to clamp the ends of the wire against the head during the welding process.

12. In a machine for forming wire loops the combination of a head provided at one point of its surface with an electrode, in combination with means for bending a wire section about the head so that its ends will overlap on such electrode and a secondary electrode movable in opposition toward the first.

13. In a machine for forming wire loops the combination of a head provided at one point of its surface with an electrode, in combination with means for bending a wire section about the head so that its ends will overlap on such electrode and a secondary electrode movable in opposition toward the first, and means for yieldingly forcing said electrodes together.

14. In a machine for forming wire loops the combination of a head provided at one point of its surface with an electrode, in combination with means for bending a wire section about the head so that its ends will overlap on such electrode and a secondary electrode movable in opposition toward the first, said electrodes grooved to receive the ends of the wire section.

15. In a machine for forming wire loops the combination of a head provided at one point of its surface with an electrode, in combination with means for bending a wire section about the head so that its ends will overlap on such electrode and a secondary electrode movable in opposition toward the first and means for yieldingly forcing them together.

16. In a machine for forming wire loops the combination of a head provided at one point of its surface with an electrode in combination with means for bending a wire section about the head so that its ends will overlap on such electrode one on top of the other and a secondary electrode movable in opposition toward the first.

17. In a machine for forming wire loops the combination of a head provided at one point of its surface with an electrode in combination with means for bending a wire section about the head so that its ends will overlap on such electrode one on top of the other and a secondary electrode movable in opposition toward the first, and means for yieldingly forcing said electrodes together.

18. In a machine for forming closing wire loops the combination of a loop forming head with means for forming and finishing the loop thereon and for forcing the finished loop therefrom said means comprising a sliding sleeve which is adapted to slide over such forming head.

19. In a machine for forming closing wire loops the combination of a head on which the wire loop is formed with a reciprocating sleeve and means for moving the same across the surface of the head to push the finished loop therefrom.

20. In a machine for forming wire loops the combination of a head on which the wire loop is formed with a reciprocating sleeve and means for moving the same across the surface of the head to push the finished loop therefrom, said sleeve cut away to leave room for the loop forming mechanism.

21. In a machine for forming wire loops the combination of a head on which the loop is formed with an electrode movable toward the head and wire bending devices adapted to encircle the head and a sliding ejector adapted to slide over the head and connecting operative means whereby the ejector moves forward when the electrode and bending devices are retracted.

22. In a machine for forming wire loops the combination of a loop forming head with a guide rod projecting therefrom and an ejector and means for sliding the same across the head so as to force the finished loop therefrom on to the holder.

23. In a machine for forming wire loops the combination of a loop forming head with a guide rod projecting therefrom and an ejector and means for sliding the same across the head so as to force the finished loop therefrom on to the holder, said guide rod having at its outer end a holder wire to receive the loops.

24. In a machine for forming wire loops the combination of a loop forming head with a guide rod projecting therefrom and an ejector and means for sliding the same across the head so as to force the finished loop therefrom on to the holder, said guide rod having at its outer end a holder wire to receive the loops and a finger to act as a stop for said loops.

25. In a machine for forming wire loops the combination of a loop forming head with a guide rod projecting therefrom and an ejector and means for sliding the same across the head so as to force the finished loop therefrom on to the holder, said guide rod having at its outer end a holder wire to receive the loops and a finger to act as a stop for said loops and means for yieldingly holding said stop in position.

26. In a wire bending machine, a forming head and bending fingers in opposition thereto, means carried by one of said fingers for cutting off suitable lengths of wire, and means carried by each of said fingers for holding one end of the wire lengths above the other.

27. A machine for forming wire loops comprising a supporting frame, a driving shaft, a gear thereon, a second gear intermeshing with and driven by the first named gear, wire clamping and feeding means on said gears, means for forming the loop and means for making and breaking the primary circuit operated from one gear and means for closing the secondary circuit operated from the other gear.

28. In a wire loop forming machine a forming head, a supporting frame therefor, means for clamping the opposed ends of the wire sections against said head and means for inducing a welding current through said clamping means, said head and said frame and through the opposed ends of the wire.

29. In a wire loop forming machine, a forming head, a frame therefor and a conducting channel depending from said frame, an electrode in opposition to said forming head and a lever carrying said electrode and pivotally mounted upon said conducting channel.

30. In a wire loop forming machine a forming head, a frame therefor and a conducting channel depending from said frame, an electrode in opposition to said forming head and a lever carrying said electrode and pivotally mounted upon said conducting channel, means for sending a welding current from said channel through said frame, forming head, the wire loop upon said head, the electrode, the lever and back to the channel.

31. In a wire loop forming machine a forming head, and grooved fingers rotatably mounted in opposition to said head, said fingers rotatably mounted and carrying pinions in mesh one with the other and means for rotating one of said pinions to bring the fingers into contact with the head.

32. In a wire loop forming machine a forming head and grooved fingers rotatably mounted and carrying pinions in mesh one with the other and means for rotating one of said pinions to bring the fingers into contact with the head, said means comprising a reciprocating rack in mesh with said pinion and a cam to reciprocate said rack.

33. In a wire loop forming machine a forming head and grooved fingers rotatably mounted and carrying pinions in mesh one with the other and means for rotating one of said pinions to bring the fingers into contact with the head, said means comprising a reciprocating rack in mesh with said pinion and a cam to reciprocate said rack and a retracting spring to hold the end of said rack against the cam.

34. In a wire loop forming machine a forming head and grooved fingers rotatably mounted and carrying pinions in mesh one with the other and means for rotating one of said pinions to bring the fingers into contact with the head, said means comprising a reciprocating rack in mesh with said pinion and a cam to reciprocate said rack and a cam roller interposed between the end of said rack and said cam.

35. In a wire loop forming machine a forming head an ejector sleeve slidably mounted thereon and a yielding driven connection for said sleeve.

36. In a wire loop forming machine a forming head an ejector sleeve slidably mounted thereon and a lever and cam operating said ejector sleeve and yielding connection interposed between said lever and said sleeve.

37. In a wire loop forming machine a forming head and a hollow support therefor, an ejector sleeve slidably mounted on said head and a slidable plunger within said support and carrying said sleeve, an ejector cam, an ejector lever driven by said cam and a sliding plunger carried by said lever, a yielding connection between said ejector and said carrying plunger.

38. In a wire loop forming machine a forming head and a hollow support therefor, a sliding sleeve reciprocating within said head and a plunger below said sleeve and connected thereto by yielding connection, an ejector sleeve carried by said plunger and slidably mounted upon the head and means for reciprocating said sliding sleeve.

39. In a loop forming machine an ejector sleeve, driving means therefor and yielding connection between said driving means and said sleeve, a clutch and means carried by said driving means and in opposition to said ejector sleeve for disengaging the clutch.

40. In a loop forming machine a clutch and clutch lever, a latch to hold said lever in the operative position, a loop forming head and an ejector sleeve slidably mounted thereon, a cam surface on said ejector sleeve, driving means yieldingly connected to said ejector sleeve and means carried by said driving means and in opposition to said cam surface for unlatching the clutch lever.

41. In a loop forming machine means for ejecting formed rings comprising a sliding ejector sleeve, driving means therefor yieldingly connected thereto and means carried by said driving means in opposition to said sleeve for stopping the machine when the sleeve does not operate in response to its operating means.

42. In an electric welding machine, work shaping mechanism having a part over which the ends of a piece of work are lapped in laterally abutting relation, means operable to lap the work ends, and means operable to electrically weld the lapping ends of the work.

43. In an electric welding machine, coöperating male and female work shaping parts, the male part having a portion thereof forming an electrode, means operable to fold work portions over the male part with their ends lapping each other over the electrode and a second electrode for coöperating with the first electrode to weld the lapping work ends intermediate the folding means.

ADELMER M. BATES.

Witnesses:
CYNTHIA MCDOWELL,
EDWARD T. WRAY.